Patented July 3, 1951

2,559,347

UNITED STATES PATENT OFFICE 2,559,347

DRYING COMPOSITIONS RESISTANT TO GAS CHECKING AND FROSTING

Hans Dannenberg, Berkeley, Calif., assignor to Shell Development Company, San Francisco, Calif., a corporation of Delaware No Drawing. Application September 1, 1949, Serial No. 113,678

9 Claims. (Cl. 260—19)

This invention relates to polyhydric alcohol drying esters of fatty acids containing conjugated carbon-to-carbon double bonds having admixed therewith a particular type of salt which permits the ester to dry without gas checking and frosting. In brief, the invention pertains to the following:

A composition of matter comprising polyhydric alcohol esters of a fatty acid containing conjugated carbon-to-carbon double bonds having dissolved therein a salt in amount which substantially prevents the esters from gas checking and frosting upon drying as a film, the salt being an alkaline earth metal of a phenol-aldehyde condensation product, preferably, a calcium salt of an alkylated phenol-formaldehyde resin.

Certain natural and synthetic drying oils which are esters of fatty acids containing conjugated double bonds dry as films at ordinary temperature or under baking conditions with development of an undesirable quality known as gas checking or frosting. Although the exact reason for this unwanted result is not fully known, it causes the dried film to have a rough, wrinkled appearance which is unstable for many purposes. The present invention provides means for preventing or substantially lessening the gas checking or frosting, the latter being the accepted designation of the more advanced form of the former.

According to the discovery of the present invention, it has been found that by incorporating an alkaline earth metal salt of a phenol-aldehyde resin, particularly a calcium salt, with the drying oil, the resulting composition dries without substantial development of gas checking and/or frosting. The alkylated phenol-aldehyde resinous condensation products, employed as salt thereof, are well known substances which are commercially available. They are usually obtained by condensing the phenol with an aldehyde, of which formaldehyde or acetaldehyde is most preferred, although other aldehydes such as aliphatic, aromatic, or cyclic aldehydes like propionaldehyde, butyraldehyde, benzaldehyde, furaldehyde and the like, may be used if desired. The condensation is effected by heating the phenol and aldehyde in the presence of an acidic or basic catalyst in customary manner so that an oil-soluble, viscous liquid to resinous product is obtained. While methods of preparation of such condensation products have been repeatedly described in the art, details thereof along with preparation of the metal salts are given in U. S. Patent No. 2,250,188.

The alkyl phenols used in forming the condensation product preferably contain a single branched-chain alkyl group of 3 to 12 carbon atoms, and have the substituent present in the ortho or para-positions, most preferably the para-position. Among particular phenols may be listed p-isopropylphenol, o - isopropylphenol, p - tert. butylphenol, p-tert. amylphenol, p-octyphenol, p-dodecylphenol. Also included within the scope of the term alkyl phenol-aldehyde condensation products are the reaction products of the alkyl phenol with acetylene in the presence of zinc naphthenate, which products are well known technically as koresin. Koresin is the same as the condensation product of the phenol with acetaldehyde and is so recognized in the art, which fact is exemplified by the article at page 73 of Industrial Engnieering Chemistry of January 1949. Details of preparation of koresin are given in U. S. Patent No. 2,072,825.

Any of the alkaline earth metal salts of the phenol-aldehyde condensation products are suitable for use in the invention, although, in general, it is preferred to employ calcium or barium salts, particularly the former. Among agents well suited to prevent gas checking and frosting of the esters are the calcium salt of tert. butylphenol-formaldehyde condensation product, the calcium salt of tert. amylphenol-formaldehyde condensation product, the calcium salt of iso-octyl-phenol-formaldehyde condensation product, and the calcium salt of koresin from tert. butylphenol.

The salts of the phenol-aldehyde condensation products are readily prepared by merely heating an equivalent proportion of the metal hydroxide with the resin. Temperatures of about 60 to 110° C. are suitable for this purpose. The salts may also be obtained in a single operation wherein the alkylated phenol is condensed with the aldehyde in the presence of sufficient metal hydroxide that the formed product is the desired salt. In other words, the condensation and the salt formation are effected in a single operation, details of which will be explained hereinafter. If desired, the salts may also be produced from the condensation product by reacting an alkaline earth metal alcoholate such as calcium ethylate with the resinous phenol-aldehyde condensation product. This reaction producing the salt is effected under substantially anhydrous conditions at refluxing temperatures of say 60 to 100° C. in the presence of an excess of the alcohol used as the metal alcoholate.

The principal constituent of the composition is the drying ester which is a derivative of any polyhydric alcohol including glycerol, erythritol, pentaerythritol, diglycerol, sorbitol and the like, as well as polymeric polyhydric alcohols which are reaction products of dihydric phenols and epichlorhydrin or dichlorhydrin in alkaline medium. These last-mentioned polymeric alcohols contain alternating aliphatic chains and aromatic nuclei separated by ether-oxygen atoms and also contain about 4 to 20 esterifiable groups for reaction with the unsaturated fatty acids. The polymeric alcohols may be prepared from any of the various dihydric phenols including mononuclear phenols like resorcinol, catechol, hydroquinone, etc., or polynuclear phenols like bis-(4-hydroxyphenyl)-2,2-propane, 4,4'-dihydroxybenzophenone, bis-(4-hydroxyphenyl)-1,1-ethane, bis-(4-hydroxyphenyl) - 1,1 - isobutane, bis - (4-hydroxyphenyl) - 2,2 - butane, bis - (4 - hydroxy-2-methylphenyl) - 2,2 - propane, bis-(4-hydroxy-2-tertiarybutylphenyl) - 2,2 - propane, bis - (2-hydroxynaphthylmethane)-1,5-dihydroxynaphthalene, etc. These polyhydric alcohols are made by heating at 50° C. to 150° C. the dihydric phenol with epichlorhydrin or dichlorhydrin using one to two or more moles of epichlorhydrin per mole of the dihydric phenol. Also present is a base such as sodium or potassium hydroxide in amount of 10% to 30% stoichiometric excess of the epichlorhydrin, i. e., 1.1 to 1.3 equivalents of base per mole of epichlorhydrin. The heating is continued for several hours to convert the reactant to a taffy-like consistency whereupon the reaction mixture is washed with water until free of base Although the product is a complex mixture, the principal substances therein may be represented by the formula

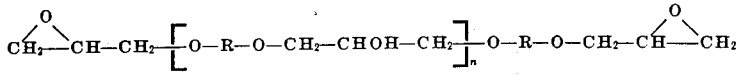

wherein R represents the divalent hydrocarbon radical of the dihydric phenol and $n$ is 0, 1, 2, 3, 4, etc. The length of the chain can be made to vary by changing the molecular proportion of epichlorhydrin and dihydric phenol. Thus, by decreasing the moles of epichlorhydrin per mole of dihydric alcohol from about two downwards toward one, the molecular weight and softening point of the product are increased. Other polymeric polyhydric alcohols of this same general type are disclosed in U. S. Patent No. 2,456,408, which also describes methods of preparing fatty acid esters therefrom, which methods are suitable for preparing the esters of the present invention.

The esters of the polyhydric alcohols are derivatives of any fatty acids having a pair of conjugated carbon-to-carbon double bonds. Although it is preferred to apply the principle of the invention to polyhydric alcohol esters of dehydrated castor oil fatty acids which contain 9 11-octadecadienoic acid, it may be applied to the esters of other fatty acids of 12 to 20 carbon atoms having conjugated double bonds. These others are available by additively chlorinating in known manner monoolefinic acids and then dehydrochlorinating the product according to the method of U. S. Patent No. 2,466,340. For example, 9-octadecenoic acid (oleic acid) is chlorinated to give 9,10-dichlorodecanoic acid which is then dehydrochlorinated to produce the conjugated doubly-unsaturated acid, 8,10-octadecadienoic acid. In like manner, there are obtained such representative and suitable acids as 8,10-dodecadienoic acid, 4,6-tetradecadienoic acid, 8,10-hexadecadienoic acid, 5,7-octadecadienoic acid, 8,10-octadecadienoic acid, 10,12-octadecadienoic acid, 8,10-eicosadecandienoic acid, and the like. Another source of conjugated fatty acids is treatment of natural oils, the acids therefrom or methyl esters thereof with isomerization catalysts such as aqueous or alcoholic solutions of alkalies, siliceous earths, metallic oxides and various other catalysts. In this way, various natural oils or their indicated derivatives like corn oil, cottonseed oil, soybean oil and the like have the linoleic acid contained or combined therein converted to a product containing conjugated carbon-to-carbon double bonds.

The esters with which the invention is concerned are obtainable in usual fashion by esterifying the polyhydric alcohol with the unsaturated fatty acid. This is accomplished by heating the reactants, preferably using a slight excess, e, g., 10%, of polyhydric alcohol, at a temperature of about 150 to 300° C. and preferably in an inert atmosphere substantially devoid of oxygen such as carbon dioxide. Preparation of the esters in this manner is, for example, described in detail in U. S. Patent No. 2,456,408, and is equally applicable regardless of the particular polyhydric alcohol employed. Another method which is particularly adapted to preparation of the highly unsaturated esters makes use of the reaction of methyl ester of the unsaturated fatty acid with the polyhydric alcohol desired to be esterified. The polyhydric alcohol is mixed with the methyl ester of the unsaturated fatty acid and in the presence of about 0.05 to 1% of sodium methylate. The mixture is heated under reflux conditions. The formed methyl alcohol is removed as distillate during the course of the reaction.

Although the fatty acids containing conjugated double bonds which are present in the esters are responsible for development of the undesired gas checking and frosting upon drying, it is not necessary that the ester be composed exclusively of acyl radicals from such acids. For example, dehydrated castor oil contains only about 50% of acyl radicals having conjugated double bonds therein, but it is quite prone to development of gas checking and frosting. In general, the esters are not derivatives of a single acid, but rather, are derived from a mixture of acids and the invention is particularly applicable to those esters containing at least 10% of the acyl groups having conjugated double bonds therein. The other acids from which the esters may be derived include monoolefinic acids such as oleic acid, etc., as well as saturated fatty acids such as lauric, palmitic and/or stearic acids. The invention is also applicable to modified alkyd resins which are polyhydric alcohol esters of dicarboxylic acids such as phthalic acid or anhydride, and the conjugated doubly-unsaturated fatty acid.

The alkaline earth metal salts of the phenol-aldehyde condensation products are very efficient in preventing gas checking and frosting of the esters. Consequently, only minor amounts thereof need be incorporated with the ester in order to accomplish the result desired, namely, substantially prevent gas checking and frosting of the ester upon drying, especially as a film. In general, the amount of salt which accomplishes the result desired is within the range of about 0.1 to 2%. A particularly preferred range wherein the remedial effect is most pronounced is from about 0.2 to 1%.

In using the composition of the invention, it is, of course, desirable to incorporate therewith other ingredients than the ester and salt. The composition is used as vehicle in combination with other ingredients such as driers, thinners, pigments, resins, and the like. Such surface-coating mixtures containing the compositions of the invention are applied as films by spraying, brushing or dipping to the surface of wood, glass or metal. The films are dried and hardened by the action of oxygen present in air which contacts the film. Evaporation removes volatile solvents from the surface-coating mixtures and drying of the resin-forming film thereof may be effected either at ordinary temperature or forced under baking conditions.

The following examples are given for the purpose of describing in detail preparation of the metal salts, preparation of unsaturated fatty acid esters and preparation of compositions of the invention with illustrations of the beneficial effects thereof.

Example I

The calcium salt of octylphenol-formaldehyde condensation product was prepared in the following manner. There was added 2% of concentrated sulfuric acid (95%) to phenol and the mixture was heated to 125° C. An equimolar amount of diisobutylene was then added to the molten mixture, care being taken that the reaction temperature did not exceed 125° C., at which temperature the reaction mixture was stirred for 3 hours. The mixture was allowed to cool to about 75° C., neutralized with dilute aqueous ammonia, and then diluted with three times its own weight of diisobutylene. Finely powdered lime was next added in amount of 25% to the crude alkylate (25% of the sum of the weights of the charged phenol and initial diisobutylene). Formaldehyde as an aqueous 37% solution was charged rapidly to the mixture in amount such that there was 1.3 moles of formaldehyde per mole of p-octylphenol assuming the conversion to the alkylated phenol was 100% complete. To effect the condensation, the reaction mixture was stirred and held at about 50° C. for 2 hours and then increased to 75° C. for an additional hour. The mixture was then filtered to remove excess lime and other insolubles. The upper phase of the filtrate was separated and dried at 130–140° C. under a pressure of 10 to 20 inches of mercury whereby the powdered calcium salt of the octylphenol-formaldehyde condensation product was obtained. The product had a sulfate ash of 18.7% indicating that it contained 5.5% calcium.

Example II

The calcium salt of tert butylphenol-formaldehyde condensation product was prepared from the commercially available, resinous condensation product known in the trade as Bakelite BR-4036. About 100 parts by weight of the powdered resin were mixed with 100 parts of calcium oxide and 115 parts of water. The mixture was heated at 100° C. for 1½ hours after which the product was powdered, dissolved in benzene, filtered, freed from solvent by distillation and dried in vacuo at 100° C. The final product contained 5.1% calcium.

Example III

There was prepared the calcium salt of which is known in the art as koresin, namely, the reaction product of p-tert butylphenol with acetylene in the presence of zinc naphthenate. Details of the method of preparation of this resin are given in U. S. Patent No. 2,072,825. In order to free the resin of zinc, it was dissolved in benzene and the solution percolated through bleaching earth as described in the above-mentioned patent. After this treatment analysis showed the purified koresin had a sulfated residue of only 0.006% and a hydroxyl value of 0.404 equivalent per 100 grams.

The calcium salt was prepared by use of calcium ethylate. About 11 parts (0.55 eq.) of calcium metal was refluxed with 79 parts of anhydrous ethyl alcohol until hydrogen evolution ceased. To the alcoholic suspension of calcium ethylate, 110 parts (0.55 eq.) of purified koresin dissolved in 264 parts of benzene were added. The mixture was refluxed for one hour with stirring, then stripped of alcohol and benzene. The residue was taken up in 880 parts of benzene and the solution filtered. One-half of the filtrate was stripped of solvent, the last traces being removed by heating on a water bath at 5 mm. Hg. There were thus obtained as residue 47 parts of oil-soluble calcium salt with a sulfated residue of 26.0% which corresponds to 0.41 equivalent per 100 grams of the purified koresin.

Example IV

Polymeric polyhydric alcohol containing alternating aliphatic chains and aromatic nuclei united through ether oxygen was prepared from bis - (4 - hydroxyphenyl) -2,2-propane and epichlorhydrin.

In a reaction vessel fitted with a stirrer, 4 moles of bis-(4-hydroxyphenyl)-2,2-propane and 6.43 moles of sodium hydroxide as a 10% aqueous solution were mixed and heated. To this hot solution were added 5 moles of epichlorhydrin while the reaction mixture was stirred. The temperature was adjusted so the mixture was heated at about 100° C. for 80 minutes and was maintained at 100 to 104° C. for an additional 60 minutes under reflux. Thereafter the aqueous layer was decanted and the resinous polyhydric alcohol washed with boiling water until neutral to litmus whereupon the product was drained and dehydrated by heating to about 150° C.

The polyether had a softening point of 100° C. by Durran's mercury method and a molecular weight of 1133 measured by boiling point elevation of a dioxane solution. The equivalent weight to esterification was 174.

Example V

The dehydrated castor oil acid ester of the polyhydric alcohol of Example IV was prepared. Experience had shown that most pronounced gas checking and frosting were obtained with the ester produced at as low a temperature as possible. Use of low temperature apparently minimized the bodying effect which is known to degrease gas checking and frosting.

A charge consisting of 132 parts by weight of the polyhydric alcohol of Example IV and 169 parts of distilled methyl ester of dehydrated castor oil fatty acid was dried by heating for 40 minutes at 140° C. and 0.5 mm. Hg pressure, with a slow stream of dry nitrogen passing through. Then 0.1% of sodium methylate in xylene suspension was added as catalyst and heating continued at 120° C. for 6 hours. The evolved methanol was collected as distillate. The product was filtered to remove the catalyst, washed with methanol to remove unreacted methyl ester and dissolved in xylene.

*Example VI*

Compositions containing the ester of Example V and the salts of Examples I, II and III were prepared. The solution of ester was diluted with xylene to a Gardner-Holdt viscosity of D. The salts were added (based on the ester) in the percentages indicated in the table below, the resulting compositions flowed out on glass panels, air dried for 2 hours, and then baked at 150° C. for 30 minutes in an air oven. The results are tabulated below.

| Per Cent Additive (based on ester) | Per Cent Calcium | Appearance after baking [1] | Hardness test [2] | Toluene test [3] |
|---|---|---|---|---|
| None | 0.00 | F | 2.5 | 2 |
| Ca salt of Example I: | | | | |
| 0.1 | 0.0055 | C | 3 | 2 |
| 0.2 | 0.011 | S | 3 | 2 |
| 0.4 | 0.022 | S | 3 | 2 |
| 0.8 | 0.044 | S | 5 | 4 |
| Ca salt of Example II: | | | | |
| 0.1 | 0.0051 | C | 2.5 | 2 |
| 0.2 | 0.01 | C | 2.5 | 2 |
| 0.4 | 0.02 | S | 3 | 2 |
| 0.8 | 0.04 | S | 5 | 4 |
| Ca salt of Example III: | | | | |
| 0.1 | 0.0033 | C | 2 | 2 |
| 0.2 | 0.0066 | (C) | 2.5 | 2 |
| 0.4 | 0.013 | S | 2.5 | 2 |
| 0.8 | 0.026 | S | 3 | 2 |

[1] Appearance: S=smooth; (C)=slight checking; C=checking; F=frosting.
[2] Hardness: 1=very hard; 2=hard; 3=medium; 4=soft; 5=very soft.
[3] Toluene test: 1=unchanged; 2=softened; 3=slightly soluble; 4=partly soluble; 5=soluble.

The hardness was judged by resistance to impression of a fingernail drawn heavily across the surface. The toluene test was effected by placing a drop of toluene on the surface, allowing it to remain 15 minutes and then observing the effect thereof.

The foregoing table illustrates the excellent results of various metal salts employed in the invention. Small amounts of the salts effectively prevent gas checking and frosting of the drying ester. Moreover, even larger amounts of salt than necessary to obtain the beneficial effect do not appreciably decrease the rate of drying.

*Example VII*

Application of the principle of the invention to an air drying alkyd containing conjugated double bonds in acyl radicals as modifiers therein was tested. The alkyd resin was a commercial product known as Rezyl Resin 330–5. It was a dehydrated castor oil modified alkyd resin containing 40% dehydrated castor oil and 39% phthalic anhydride in esterified form with the equivalent amount of glycerol. A 40% solution of the resin was prepared. A film of the solution was applied to a glass panel, pre-dried for 30 minutes at room temperature, and then baked for 30 minutes at 150° C. The resulting film showed frosting on the surface thereof. Another sample of the solution containing the calcium salt of Example III in amount of 0.4% based on the resin, was coated on a glass panel and dried in like manner. The resulting film was perfectly smooth and free of gas checking or frosting.

*Example VIII*

Use of the invention in an enamel may be next illustrated. In parts by weight, the enamel contained 45 parts of titanium dioxide pigment, 55 parts of the drying ester of Example V, 53 parts of xylene, and 55 parts of a petroleum solvent boiling at 315 to 380° F. and containing about 65% aromatics. Application of the enamel to a tin-plated steel panel with 2 hours of predrying at room temperature and 30 minutes of baking at 150° C., gave a surface film which displayed frosting. By incorporating 0.165 parts (0.3% based on the drying ester) of the calcium salt of Example I, the development of frosting is prevented.

I claim as my invention:

1. A composition of matter comprising a polyhydric alcohol ester of a fatty acid of 12 to 20 carbon atoms containing a pair of conjugated carbon-to-carbon double bonds, said ester having dissolved therein an alkaline earth metal salt of an alkylated phenol-aldehyde condensation product in amount within the range of 0.1 to 2% which substantially prevents gas checking and frosting of the composition upon drying as a film, said alkylated phenol containing a branched-chain alkyl group of 3 to 12 carbon atoms linked directly to a nuclear carbon atom of the phenol.

2. A composition of matter comprising a polyhydric alcohol ester of a fatty acid of 12 to 20 carbon atoms containing a pair of conjugated carbon-to-carbon double bonds, said ester having dissolved therein a calcium salt of an alkylated phenol-aldehyde condensation product in amount within the range of 0.1 to 2% which substantially prevents gas checking and frosting of the composition upon drying as a film, said alkylated phenol containing a branched-chain alkyl group of 3 to 12 carbon atoms linked directly to a nuclear carbon atom of the phenol.

3. A composition of matter comprising a polyhydric alcohol ester of dehydrated castor oil acids having dissolved therein a calcium salt of an octylphenol-formaldehyde condensation product in amount within the range of 0.2 to 1% which substantially prevents gas checking and frosting of the composition upon drying as a film, said octyl group of the phenol being branched-chain.

4. A composition of matter comprising an alkaline earth metal salt of an alkylated phenol-aldehyde condensation product dissolved in an ester of a fatty acid of 12 to 20 carbon atoms containing a pair of conjugated carbon-to-carbon double bonds and polymeric polyhydric alcohols having alternating aliphatic chains and aromatic nuclei united through ether oxygen, which ester contains from 4 to 20 ester groups per molecule, said salt being present in said ester in an amount within the range of 0.1 to 2% which substantially prevents gas checking and frosting of said composition upon drying as a film, said alkylated phenol containing a branched-chain alkyl group of 3 to 12 carbon atoms linked directly to a nuclear carbon atom of the phenol.

5. A composition of matter comprising a calcium salt of an alkylated phenol-aldehyde condensation product dissolved in an ester of a fatty acid of 12 to 20 carbon atoms containing a pair of conjugated carbon-to-carbon double bonds and polymeric polyhydric alcohols having alternating aliphatic chains and aromatic nuclei united through ether oxygen, which ester contains from 4 to 20 ester groups per molecule, said salt being present in said ester in an amount within the range of 0.1 to 2% which substantially prevents gas checking and frosting of said composition upon drying as a film, said alkylated phenol containing a branched-chain alkyl group of 3 to 12 carbon atoms linked directly to a nuclear carbon atom of the phenol.

6. A composition of matter comprising a calcium salt of an octylphenol-formaldehyde condensation product dissolved in an ester of dehydrated castor oil acids and polymeric polyhydric alcohols having alternating aliphatic chains and aromatic nuclei united through ether oxygen, which ester contains from 4 to 20 ester groups per molecule, said salt being present in said ester in an amount within the range of 0.1 to 2% which substantially prevents gas checking and frosting of said composition upon drying as a film, said octyl group of the phenol being branched-chain.

7. A composition of matter comprising a calcium salt of a tert butylphenol-formaldehyde condensation product dissolved in an ester of dehydrated castor oil acids and polymeric polyhydric alcohols having alternating aliphatic chains and aromatic nuclei united through ether oxygen, which ester contains from 4 to 20 ester groups per molecule, said salt being present in said ester in an amount within the range of 0.2 to 1% which substantially prevents gas checking and frosting of said composition upon drying as a film.

8. A composition of matter comprising an alkaline earth metal salt of an alkylated phenol-aldehyde condensation product dissolved in a glycerol ester of dehydrated castor oil acids, said salt being present in said ester in amount within the range of 0.1 to 2% which is sufficient to substantially prevent gas checking and frosting of said composition upon drying as a film, said alkylated phenol containing a branched-chain alkyl group of 3 to 12 carbon atoms linked directly to a nuclear carbon atom of the phenol.

9. A composition of matter comprising a calcium salt of an octylphenol-formaldehyde condensation product dissolved in an ester of glycerol, a dicarboxylic acid and dehydrated castor oil acids, said salt being present in said ester in an amount within the range of 0.2 to 1% which substantially prevents gas checking and frosting of the composition upon drying as a film, said octyl group of the phenol being branched-chain.

HANS DANNENBERG.

REFERENCES CITED

The following references are of record in the file of this patent:

UNITED STATES PATENTS

| Number | Name | Date |
|---|---|---|
| 1,972,905 | Rosenblum | Sept. 11, 1934 |
| 1,988,615 | Turkington et al. | Jan. 22, 1935 |
| 2,110,085 | Hopkins | Mar. 1, 1938 |
| 2,207,997 | Courtney | July 16, 1940 |

OTHER REFERENCES

Bowman: Paint Mfg., April 1938, page 132.